(12) United States Patent
Bedingfield, Sr.

(10) Patent No.: US 8,112,632 B2
(45) Date of Patent: Feb. 7, 2012

(54) SECURITY DEVICES, SYSTEMS AND COMPUTER PROGRAM PRODUCTS

(75) Inventor: James C. Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1434 days.

(21) Appl. No.: 11/291,054

(22) Filed: Nov. 30, 2005

(65) Prior Publication Data

US 2007/0124597 A1    May 31, 2007

(51) Int. Cl.
*H04L 9/32* (2006.01)
(52) U.S. Cl. ........... 713/186; 713/182; 713/184; 726/2; 726/20; 726/21; 235/435; 235/446; 340/5.73; 340/5.74; 340/5.81; 340/5.82
(58) Field of Classification Search .......... 726/2, 26–27, 726/20–21; 713/182, 186, 184; 235/435, 235/446; 340/5.73, 5.74, 5.81, 5.82
See application file for complete search history.

(56) References Cited

U.S. PATENT DOCUMENTS

| | | | | |
|---|---|---|---|---|
| 5,180,901 A * | 1/1993 | Hiramatsu | ..................... | 235/380 |
| 6,111,977 A * | 8/2000 | Scott et al. | ..................... | 382/124 |
| 6,282,655 B1 * | 8/2001 | Given | ............................. | 726/34 |
| 6,775,776 B1 * | 8/2004 | Vogt et al. | ..................... | 713/186 |
| 6,826,369 B1 * | 11/2004 | Bondarev et al. | ............. | 398/107 |
| 6,877,665 B2 | 4/2005 | Challa et al. | | |
| H2120 H * | 7/2005 | Cudlitz | ......................... | 235/382 |
| 6,931,538 B1 * | 8/2005 | Sawaguchi | .................... | 713/186 |
| 7,131,009 B2 * | 10/2006 | Scheidt et al. | ................ | 713/182 |
| 7,168,091 B2 * | 1/2007 | Schutzer | .......................... | 726/7 |
| 7,210,166 B2 * | 4/2007 | Davis et al. | ...................... | 726/6 |
| 2004/0037250 A1 * | 2/2004 | Refai | ............................. | 370/335 |
| 2004/0220798 A1 * | 11/2004 | Chi et al. | ...................... | 704/201 |
| 2004/0238621 A1 * | 12/2004 | Beenau et al. | ................ | 235/380 |
| 2005/0039027 A1 * | 2/2005 | Shapiro | ........................ | 713/186 |
| 2005/0087597 A1 * | 4/2005 | Gotfried et al. | ............... | 235/382 |
| 2005/0269402 A1 * | 12/2005 | Spitzer et al. | ................. | 235/380 |
| 2006/0036857 A1 * | 2/2006 | Hwang | ......................... | 713/168 |
| 2006/0123465 A1 * | 6/2006 | Ziegler | ............................. | 726/2 |
| 2006/0136741 A1 * | 6/2006 | Mercredi | ..................... | 713/185 |
| 2006/0267727 A1 * | 11/2006 | Cayne et al. | ................. | 340/5.22 |

\* cited by examiner

*Primary Examiner* — Yin-Chen Shaw

(74) *Attorney, Agent, or Firm* — Cantor Colburn LLP

(57) ABSTRACT

A security device having a knowledge input module obtaining knowledge data and a user data storage module storing user-specific data. A processor performs at least part of a user authorization process in response to the knowledge data and the user-specific data. An emitter in communication with the processor emits a signal indicative of the result of the user authorization process.

9 Claims, 3 Drawing Sheets

SECURITY DEVICES, SYSTEMS AND COMPUTER PROGRAM PRODUCTS

BACKGROUND

The present invention relates generally to security. Many types of devices exist for authenticating an individual prior to granting the user access. The access may be physical (e.g., access to a locked door) or virtual (e.g., access to information). Authenticating a user for the purposes of access normally includes verifying one or more of the following general types of information: who the user is (e.g., biometric information), what the user possesses (e.g. a key or card), and what the user knows (e.g., a password or PIN).

A common form of computer access control uses a combination of (1) a device which generates a pseudo-random number (e.g., the SecureID® token manufactured by RSA Security) and (2) a personal identification number (PIN) known to the user. In a typical use of these two pieces of information, a user attempting to gain access to a computer application enters the user's login name, and a passcode consisting of the PIN plus the pseudo random number displayed on the token, which cycles to a new number every minute to reduce vulnerability due to "electronic eavesdropping". While this method provides reasonable security and works fairly well, it has limitations. The pseudo-random digit string must be relatively short to minimize user errors in data entry. Additionally, the method requires a keyboard or digit pad to allow the user to enter the PIN.

SUMMARY

Exemplary embodiments include a security device having a knowledge input module obtaining knowledge data and a user data storage module storing user-specific data. A processor performs at least part of a user authorization process in response to the knowledge data and the user-specific data. An emitter in communication with the processor emits a signal indicative of the result of the user authorization process.

Exemplary embodiments include a system for granting a user access to a resource. The system includes a security device including a knowledge input module obtaining knowledge data and a user data storage module storing user-specific data. A processor performs at least part of a user authorization process in response to the knowledge data and the user-specific data. An emitter in communication with the processor emits a signal indicative of the result of the user authorization process. A receiving system receives the signal indicative of the authorization process and generates an authorization signal in response to the signal. An access system grants access to the resource in response to the authorization signal from the receiving system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

Exemplary embodiments combine two or more verification mechanisms in a security access device that communicates to a system. The verification mechanisms include, for example, (1) pseudo random code generator to create a security code ("what you have"), (2) physical inputs (e.g., multiple push buttons, motion detector, light detector) to allow PIN-like functionality ("what you know") and/or (3) biometric detector to validate the user ("who you are").

Figure 1:
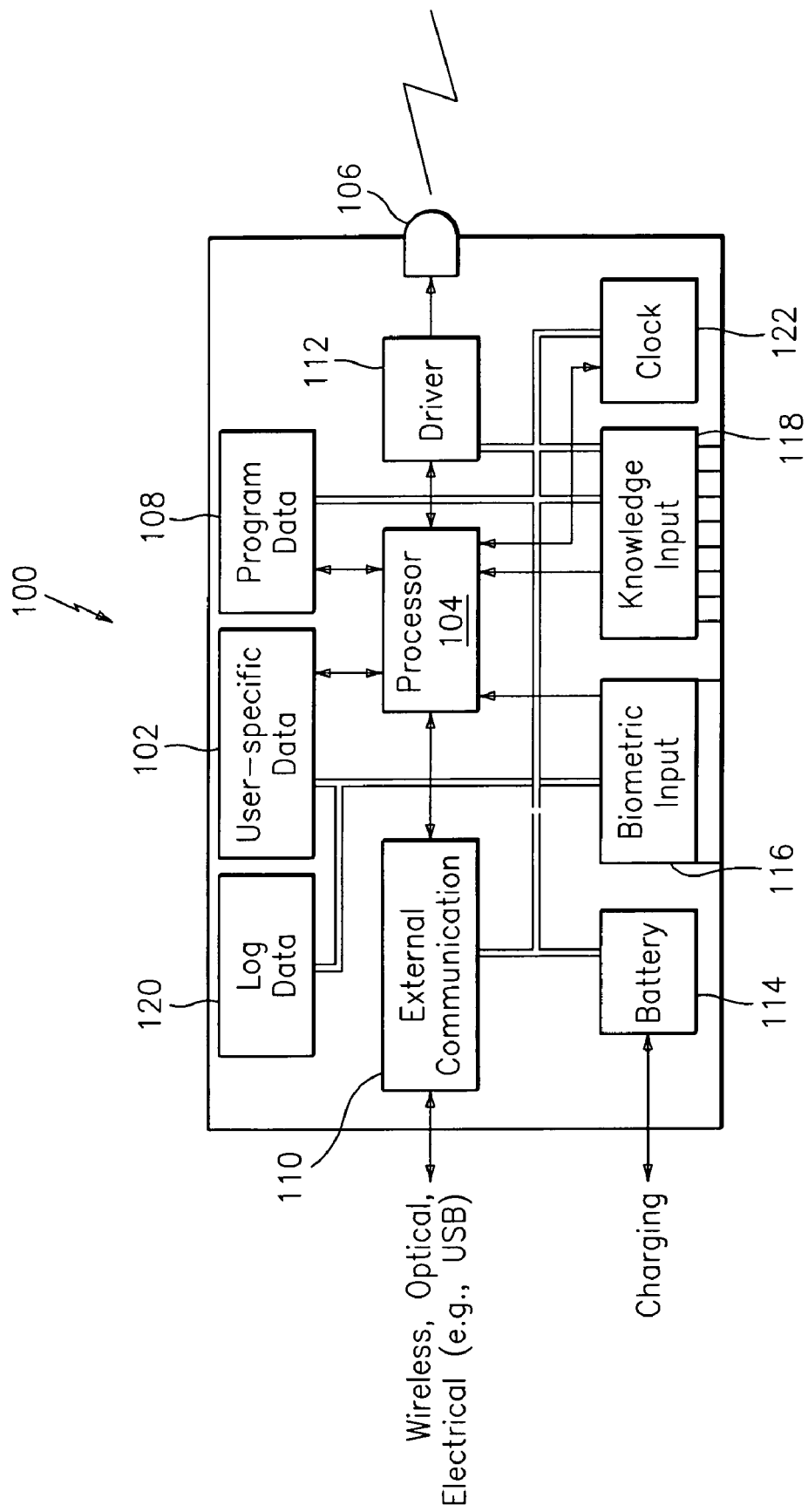
FIG. 1 is a block diagram of a security device in exemplary embodiments.

FIG. 1 is a block diagram of a security device 100 in exemplary embodiments. The security device 100 includes user-specific data 102 that may be stored in any known type of memory such as RAM. The user specific data includes stored biometric information, the seed and algorithm information for pseudo-random code (e.g., numeric, alpha-numeric) generation, and PIN-like data, such as motion, button sequence and duration information. This user specific data is written by an authorized programming system, as described in further detail herein, and is stored so that retrieval and unauthorized use of the information is difficult (e.g., encrypted). The user-specific data 102 is used by a processor 104 to create a stream of information emitted by the emitter 106 (e.g., an LED) as described in further detail herein.

Program data 108 stored in a memory module includes code that defines the functionality of the device. The program data 108 may be stored in any known type of memory such as RAM, and may be stored in the same memory module as the user-specific data 102. The program data 108 implements the desired output format, as well as interprets inputs required to create that format, and manages any error conditions. Program data 108 includes executable program instructions processed by processor 104 to implement the processes described herein.

The external communication module 110 provides connectivity through which user-specific data 102 and program data 108 can be updated by an authorized source. The external communication module 110 may support one or more communication mediums, such as wired (e.g., USB) or wireless (e.g., RFID, optical, IR) communication mechanisms.

The processor 104 executes the program data 108, responds to the inputs, and uses the user-specific data 102 to create a stream emitted by the emitter 106, which may be implemented using an LED. The stream indicates the results of the authentication process. The processor 104 may be a general-purpose microprocessor executing program code in program data 108.

The driver 112 includes the circuitry to cause the emitter 106 to emit a coded signal. Driver 112 also detects the status of the emitter 106 and can optionally report the status back to the processor 104 for logging purposes.

The battery 114 provides the power to operate the circuitry and to drive the emitter 106. In exemplary embodiments, a non-replaceable battery may be used, similar to the battery in a SecureID card, which lasts the intended life of the security device. In embodiments having medium power applications, the security device 100 may use a replaceable battery. In embodiments requiring more power, a rechargeable battery may be used, which may be recharged through an electrical connection or through an inductive coupling.

Biometric input module 116 includes one or more sensors suitable for capturing personal biometric data such as image data. A digital camera sensor chip can be used to map a facial image, to receive a retinal image (with appropriate lighting), or, to capture the image of a fingerprint. The biometric input module 116 may, on a signal from the processor 104, perform preliminary calculations on the biometric image, returning summary data for comparison by the processor 104 to the stored user data 102. Alternatively, the biometric input module 116 may return raw data to the processor 104 which performs the data analysis and comparison. The biometric analysis may be triggered by another module, such as knowledge input module 118.

The knowledge input module 118 provides a mechanism to determine that the security device 100 is being used by an authorized user. Knowledge input module 118 provides a less expensive solution than a biometric input module 116 or provides additional security when used in conjunction with a biometric input module 116. Various sensors can be used to detect user knowledge. For example, multiple push buttons that are activated in a predetermined sequence (with or without timing considerations) may be used for knowledge input module 118. For example, if four buttons are used, labeled A, B, C, D, the user must press the buttons in the correct order (B-B-C-A, for example, or B for 2 counts, C for 1 count, D for 3 counts) for authentication. Alternatively, the knowledge input module 118 may be a motion detector, which is activated by the user changing the position, attitude, or motion of the security device. For example, the user may shake, turn and/or twist the device according to a predetermined pattern, also with or without timing considerations, such as speed and/or duration of motion. This user knowledge input may be used in two ways, as determined by the active algorithm executed by processor 104. The user knowledge input may be used to "unlock" the pseudo-random code series in user data 108 causing it to be emitted by the emitter. Alternatively, the user knowledge sequence (or a portion thereof) may be transmitted as a prefix or postlude to the pseudo-random code. Finally, for certain applications, the knowledge input sequence alone may be encoded or summarized and transmitted without any additional data.

Log data 120 is optionally stored in a memory module for security purposes. The log data 120 may be stored in any known type of memory such as RAM, and may be stored in the same memory module as the user-specific data 102. The logging function is implemented by processor 104 to store event details for selected events, including the time and date, user knowledge information, biometric analysis result, and output stream before encoding for transmission.

Emitter 106 emits the signal carrying the authentication data stream. The emitted signal may be visible, infrared, or both to provide user feedback of correct operation, or to assist the user in aiming the device toward the receiving system in narrow-beam applications.

Clock 122 maintains the time and date for the system, and also provides a time reference for time-related user knowledge entries and clocking of authentication data. The clock 122 may be read and set over the external communication module 110.

Figure 2:
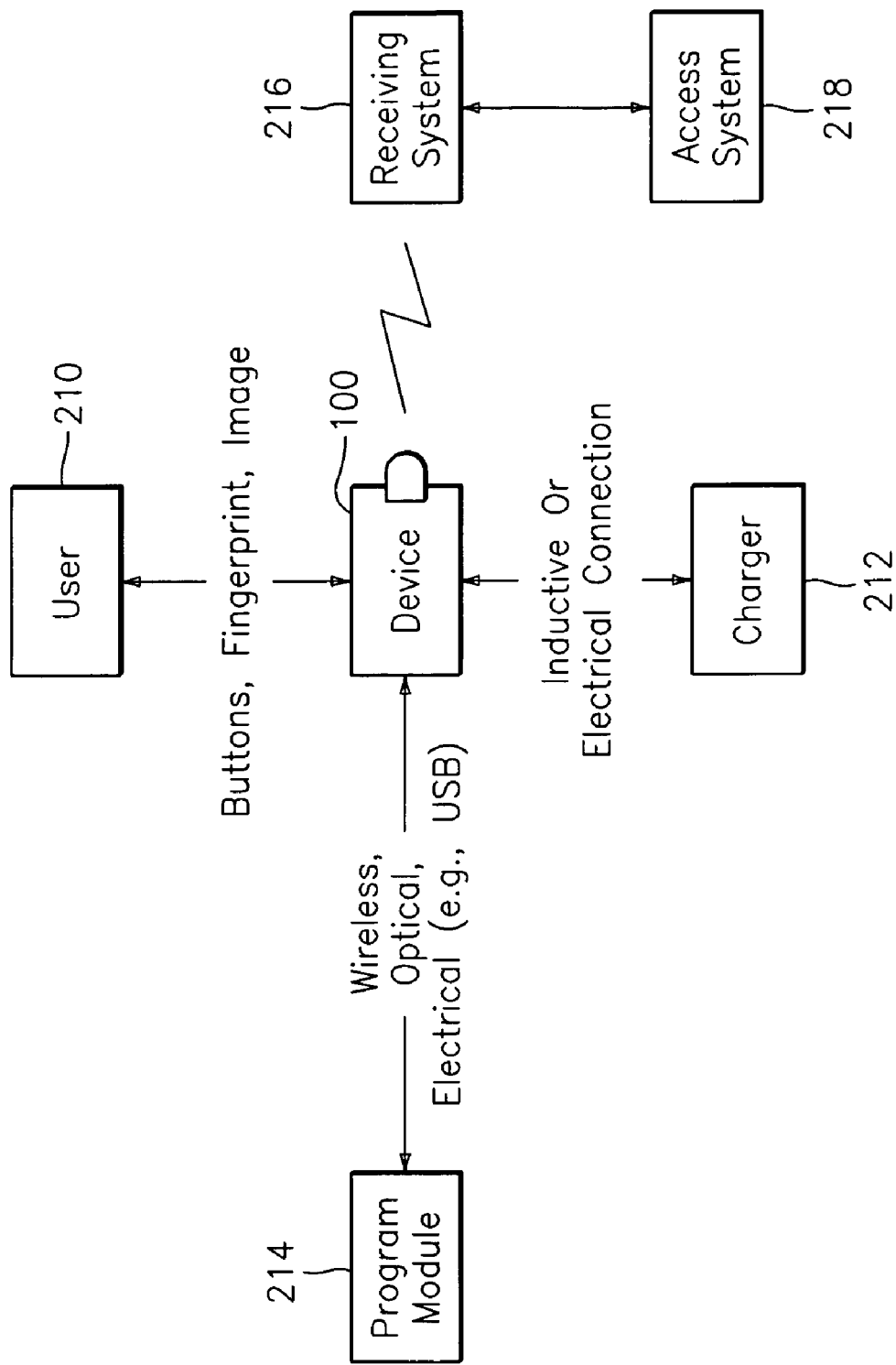
FIG. 2 is a block diagram of a system including the security device in exemplary embodiments.

FIG. 2 illustrates the security device 100 in an exemplary operating environment. In operation, the user 210 carries the security device 100, and activates the security device 100 when authentication is desired. As described in further detail herein, the user 210 may activate the security device 100 when access is desired to some resource (e.g., a locked door, a computer system file).

Figure 3:
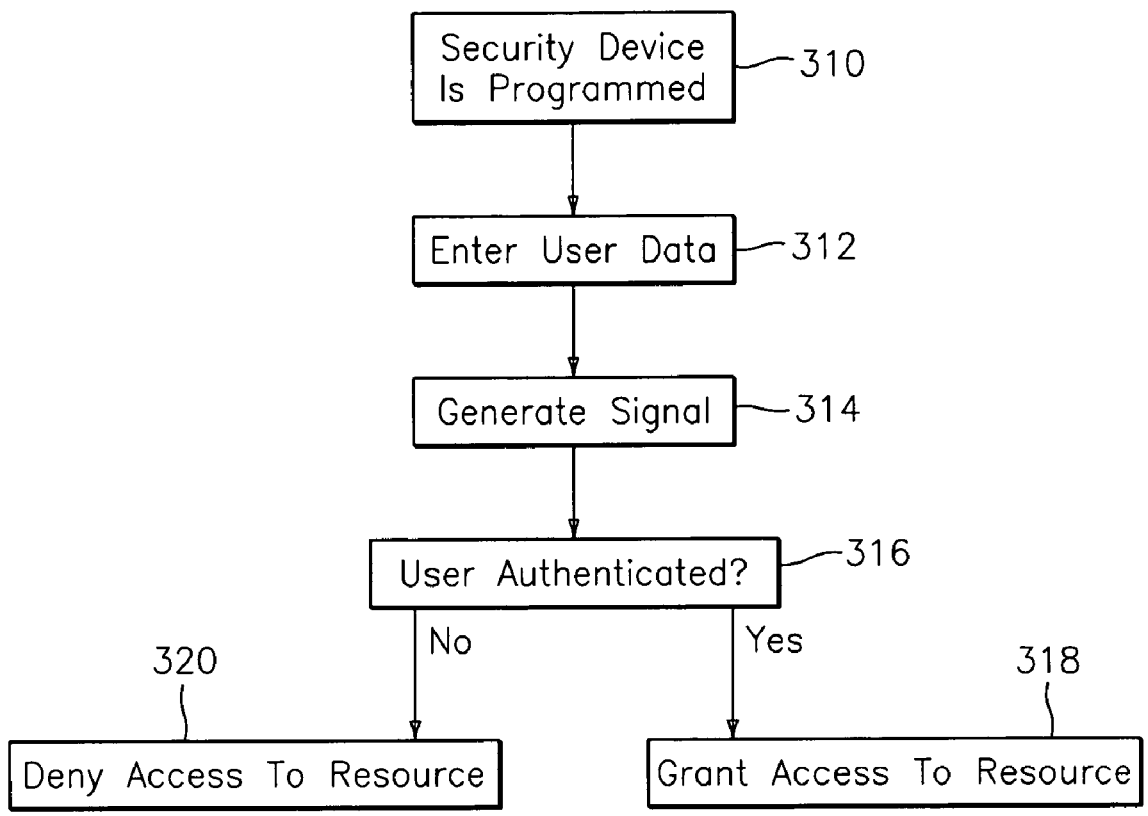
FIG. 3 is a flow chart of use of the security device in exemplary embodiments.

FIG. 3 illustrates a method of operating the security device 100 according to an exemplary embodiment. At step 310 the security device 100 is programmed. As part of this step, program module 214 (FIG. 2) connects to the security device 100 through external communication module 110 to install user-specific data (seed, authentication algorithm, login, biometric data) and program data (software, device configuration information, device encryption information). The program module 214 is also used to set the system date and time, and to retrieve log information. Program module 214 may be any processor based device such as a personal computer, server, PDA, etc. Charger 212 may be used to charge battery 114, if a rechargeable battery is included.

At step 312, the user enters user data through one or more of the techniques described herein. For example, the user may enter knowledge data such as a PIN or move the security device 100 in a pattern. Further, the user may enter biometric data such as a thumbprint, fingerprint, etc.

The signal is generated at step 314 and may include the pseudo-random code series in user data 108 causing it to be emitted by the emitter. Alternatively, the user knowledge sequence (or a portion thereof) may be transmitted as a prefix or postlude to the pseudo-random code. Finally, for certain applications, the knowledge input sequence alone may be encoded or summarized and transmitted without any additional data.

At step 316, a receiving system 216 (FIG. 2) determines if the user is authenticated based on the signal generated by the security device 100. As part of this step, the receiving system 216 receives the signal emitted by the security device 100 and processes the emitted information. The receiving system 216 analyzes the received data, and then provides appropriate instructions to the access system (e.g., admit the user if the analysis is positive, log the failed attempt if the analysis returns a negative result). The receiving system 216 may authorize the user based on one or more pieces of information including what the user has (e.g., the pseudo-random code), who the user is (e.g., biometric information) and/or what the user knows (e.g., knowledge input). As shown at steps 318 and 320, the receiving system 216 may either grant access or deny access to the resource, respectively. The access system 218 implements the access request in response to an authorization signal from the receiving system 216. The access system 218 may control access to a wide variety of resources, such as entry into a computer system, or entry into a physical location.

In operation, security device 100 is programmed with the necessary data, including a seed code for the pseudo-random code generator, knowledge input information, and/or biometric information. The user activates security device 100 by pressing a button, moving the device, exposing it to light, or the like. The security device 100 then emits a signal that is detected by receiving system 216. The receiving system 216 determines the authenticity of the signal and, if authenticity meets the security criteria, the receiving system notifies the access system to grants access to the user. Determining the authenticity of the signal may be accomplished by using one or more of the following: simple passcode validation, decryption of the message using public key or private key methods, or other methods known to those knowledgeable in the art. Alternatively, the message may be sent "in the clear" authenticated by the security device 100, and the authentication system 216 simply verifies the content of the message.

Multiple users may gain access to the same resource using a single security device 100. Each user may generate a different signal based on inputs such as the knowledge data and/or the biometric data. Alternatively, a common signal (e.g., the unlocked pseudo-random code series) may be generated for multiple users. For example, a husband and wife may use the same security device 100 to access a door to their home. The husband's PIN and/or biometric information will be different than that of the wife. The security device 100 and receiving system 216 authorize both the husband and the wife to access the resource (e.g. unlock the door) using a single security device 100.

Activation of the security device 100 may be combined with the physical input, or they may be separate functions. For example, the user may press a button to activate the security device 100, then move the device in a pre-determined pattern to authenticate the user's identity. Alternatively, the user may press a sequence of buttons to enter a PIN-like code, the first press of which also serves to activate or "wake" the device. Exemplary methods for activating the security device 100 include motion, button pressing, light exposure and receipt of a wireless communication from receiving system 216. Exemplary methods for identifying the user include pressing buttons in a particular order (PIN-like entry), moving device in a particular pattern, reading of thumbprint or finger print, and camera detection of other biometric pattern (facial recognition, retinal pattern).

Depending on the desired application, the analysis of the authenticity of the user may be performed in the security device 100, in the receiving system 216, or a combination. The emitted data stream is used to transmit the authenticate data corresponding to the user of the device. The data stream may be encrypted using public key or private key encryption methods. The data stream may include one or more of the following exemplary types of information: a code representing the result of the authentication (if authentication takes place on the security device), pseudo-random code corresponding with a system-generated code used to authenticate the token, PIN-like user-entered knowledge information, time and date, user identification information (e.g., system login name) and serial number of the device.

In addition to a fob device (e.g., a small hardware device with built-in authentication mechanisms), the described components and functionality may be included in a wireless telephone or PDA device, a television remote control, or other devices where security and authentication of a user are important. In addition to the optical emitter optical output, the user knowledge component of this device can be applied to other communication methods such radio frequency or smart card contact points.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A system for granting a user access to a locked door, the system comprising:
   a security device including:
      a knowledge input module obtaining knowledge data;
      a biometric input module obtaining biometric data;
      a user data storage module storing user-specific data, the user-specific data includes a seed and an algorithm for pseudo-random code generation;
      a processor performing a user authorization process in response to the knowledge data, the biometric data and the user-specific data;
      an emitter in communication with the processor, the emitter emitting a visible, wireless signal indicative of a result of the user authorization process, the wireless signal including the knowledge data as a prefix to the pseudo-random code, the pseudo random code being a common code for multiple users with different knowledge data;
   a receiving system receiving the signal indicative of the result of the authorization process, the receiving system generating an authorization signal in response to the signal;
   an access system granting access to the locked door in response to the authorization signal from the receiving system;
   the processor transmits the pseudo-random code to the emitter in response to the user entering valid knowledge data and valid biometric data;
   the receiving system verifying the pseudo-random code to generate the authorization signal.

2. The system of claim 1 wherein:
the knowledge input module includes a keypad, the knowledge data corresponding to a sequence of key presses on the keypad.

3. The system of claim 2 wherein:
the knowledge data includes timing of the key presses.

4. The system of claim 1 wherein:
the knowledge input module includes a motion sensor, the knowledge data corresponding to a sequence of movements of the security device according to a predetermined pattern detected by the motion sensor.

5. The system of claim 1 wherein:
the biometric data includes an image of a fingerprint of the user.

6. The system of claim 1 wherein:
the biometric data includes a facial image.

7. The system of claim 1 wherein:
the biometric data includes a retinal image.

8. The system of claim 1 further comprising:
a program module in communication with the security device, the program module providing the seed and algorithm to the security device.

9. The system of claim 1 wherein:
the security device is activated by exposing the security device to light.

* * * * *